(12) United States Patent
Luster

(10) Patent No.: US 9,274,323 B1
(45) Date of Patent: Mar. 1, 2016

(54) HYPERCENTRIC LENS ASSEMBLY WITH HIGH NUMERIC APERTURE ASPHERIC ELEMENT

(71) Applicant: Spencer D. Luster, Toledo, OH (US)

(72) Inventor: Spencer D. Luster, Toledo, OH (US)

(73) Assignee: Spencer D. Luster, Toledo, OH (US)

( * ) Notice: Subject to any disclaimer, the term of this patent is extended or adjusted under 35 U.S.C. 154(b) by 0 days.

(21) Appl. No.: 14/551,662

(22) Filed: Nov. 24, 2014

Related U.S. Application Data

(63) Continuation-in-part of application No. 13/663,170, filed on Oct. 29, 2012, now abandoned.

(60) Provisional application No. 61/552,685, filed on Oct. 28, 2011.

(51) Int. Cl.
*G02B 3/02* (2006.01)
*G02B 13/18* (2006.01)

(52) U.S. Cl.
CPC .................... *G02B 13/18* (2013.01)

(58) Field of Classification Search
CPC .................................... G02B 13/0035

USPC ......................................... 359/716
See application file for complete search history.

(56) References Cited

U.S. PATENT DOCUMENTS 6,674,582 B2 * 1/2004 Kawasaki ............ 359/690
2006/0087725 A1 * 4/2006 Arriola ............ G02B 13/143
359/357

* cited by examiner

*Primary Examiner* — James Jones
(74) *Attorney, Agent, or Firm* — Donald K Wedding

(57) ABSTRACT

An imaging hypercentric lens assembly comprising of a First Lens Group that includes: 1) At least a first high NA (0.40 or greater) aspheric lens element followed by 2) at least a second lens element that converges the light emitted from the first element to a small spot. It is further comprised of a Second Lens Group whose entrance pupil is placed at the same position as said small light spot. The Second Lens Group serves to refocus the light and form an image of an object placed in front of the First Lens Group. In this combination, the present invention allows high NA aspheric lens elements to produce good quality images of objects whose size is not limited to being considerably smaller than the diameter of the clear aperture of the high NA aspheric lens element.

7 Claims, 3 Drawing Sheets

Hypercentric Lens Assembly with High Numeric Aperture Aspheric Lens Element

FIG. 1— Conventional lens compared to hypercentric lens

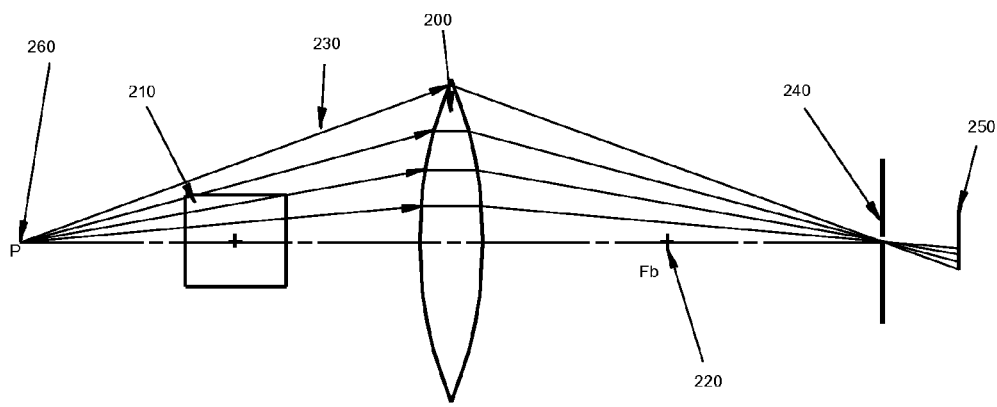
FIG. 2 – Prior Art Hypercentric Lens
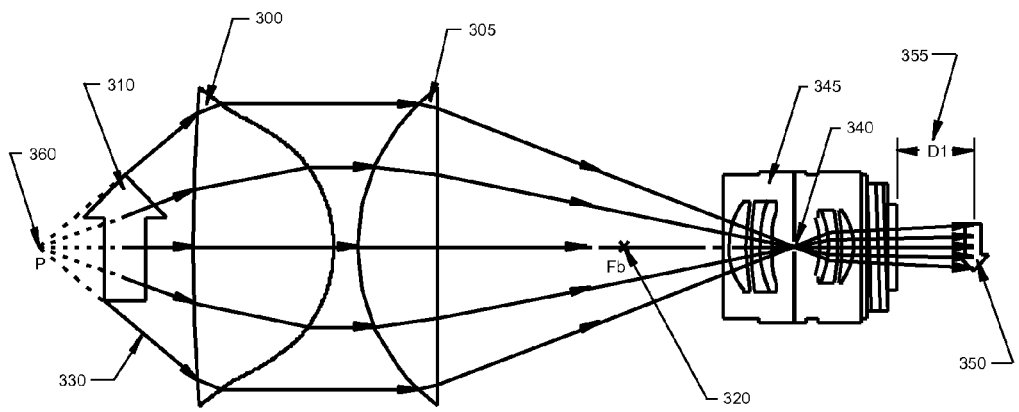
FIG. 3 – Hypercentric Lens Assembly with High Numeric Aperture Aspheric Lens Element

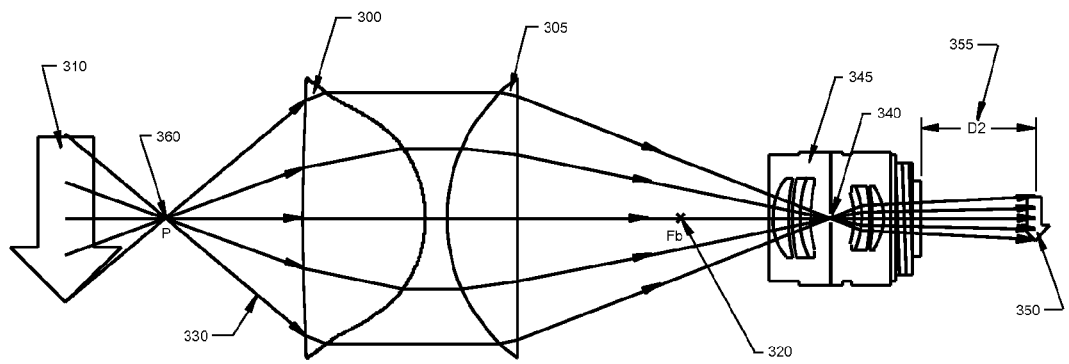
FIG. 4 – Hypercentric Lens Assembly with High Numeric Aperture Aspheric Lens Element with Increased Object and Image Distance

HYPERCENTRIC LENS ASSEMBLY WITH HIGH NUMERIC APERTURE ASPHERIC ELEMENT

RELATED APPLICATIONS

Priority is claimed under 35 U.S.C. 120 from U.S. patent application Ser. No. 13/663,170 filed Oct. 29, 2012, which claims priority under 35 U.S.C. 119(e) from U.S. Provisional Application Ser. No. 61/552,685 filed Oct. 28, 2011, all incorporated herein by reference.

BACKGROUND OF THE INVENTION

A hypercentric or pericentric lens is one in which a converging view of an object is achieved. This is as opposed to the more conventional diverging view lens common in most optical systems (including human vision), or for parallel (non-diverging, non-converging) view telecentric lenses.

Furthermore, at least two other combined properties distinguish a hypercentric lens from other types. The first property is that the entrance pupil (which may be defined as the image of the physical aperture stop as "seen" from the front of the lens) is located in front of the physical lens. The second is that such a lens may observe surfaces that are parallel to the optical axis. FIG. 1 illustrates this property. FIG. 1A shows the view of a converging view lens that is not hypercentric (such as a microscope objective), while FIG. 1B shows the essential hypercentric property.

DESCRIPTION OF RELATED PRIOR ART

Prior art designs of hypercentric lens assemblies include a front lens element or elements that are usually made from spherical refractive surfaces. Such front lens elements are followed by a pinhole or aperture at a distance greater than the focal length of the front lens elements. Sometimes an additional lens element or elements are included beyond the aperture, or combined with the aperture. The final image is formed even further beyond such an aperture or aperture and lens elements combination. Regardless, the hypercentric lens provides a converging view of the top and sides of an object placed in front of it. The following references are incorporated herein by reference.
*Handbook of machine vision* page 258; By Alexander Hornberg
Published by Wiley-VCH, 2006; ISBN 3527405844, 978352740584
*Practical handbook on image processing for scientific and technical applications*; Edition 2 page 133; By Bernd Jähne
Published by CRC Press, 2004; ISBN 0849319005, 9780849319006

It is known in the art that spherical refractive surfaces may, in general, be replaced by aspheric surfaces. Hypercentric lens assemblies may also be comprised of aspheric refractive surfaces to improve image quality. Such aspheric refractive surfaces, however, have been limited to relatively low numeric apertures (NA) of less than approximately 0.30 when used for finite conjugate ratio imaging, especially of objects whose size is not considerably smaller than the lens clear aperture diameter. Because higher NA (greater than 0.40) aspheric lenses may produce poor quality images of large objects, these are used for producing small, near diffraction limited light spots, or collimating very small light sources. Contrary to the prior art practice, this invention uses a high NA aspheric lens in a hypercentric lens assembly.

BRIEF SUMMARY OF THE INVENTION

This invention relates to an imaging hypercentric lens assembly comprised of a First Lens Group that includes: 1) At least a first high NA (0.40 or greater) aspheric lens element followed by 2) at least a second lens element that converges the light emitted from the first element to a small spot. It is further comprised of a Second Lens Group whose entrance pupil is placed at the same position as said small light spot. The Second Lens Group serves to refocus the light and form an image of an object placed in front of the First Lens Group. In this combination, the present invention allows high NA aspheric lens elements to produce good quality images of objects whose size is up to 90% of the diameter of the clear aperture of the high NA aspheric lens element.

BRIEF DESCRIPTION OF THE DRAWINGS

FIG. 2 shows an example of a prior art hypercentric lens system.
FIG. 3 shows one form of the present hypercentric lens system.
FIG. 4 illustrates a feature of the present hypercentric lens system.

DETAILED DESCRIPTION OF THE DRAWINGS

Figure 1A:
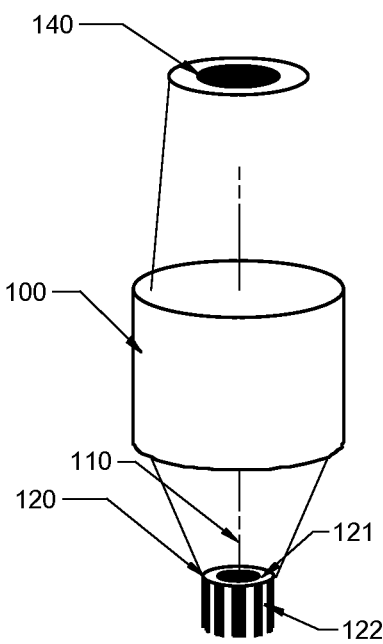
FIG. 1A shows a conventional lens viewing an object.

FIG. 1A shows a conventional lens (100), such as a microscope objective, having an optical axis (110). Said lens 100 views a cylindrical object (120) having a top (121) that is essentially perpendicular to the optical axis, and a side (122) that is parallel to the optical axis. The lens 100 forms an image (140) only of the top (121) of the object.

Figure 1B:
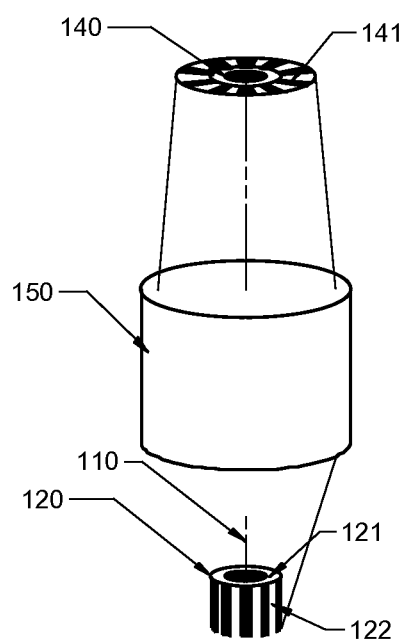
FIG. 1B shows a hypercentric lens viewing an object

FIG. 1B shows a hypercentric lens (150) having an optical axis 110. Said lens 150 views a cylindrical object 120 having a top 121 that is essentially perpendicular to the optical axis and a side 122 that is parallel to the optical axis. The lens 150 forms an image 140 of the top 121 as well as the side 122 of the object.

FIG. 2 shows an example of a prior art hypercentric lens system in which a spherical lens element (200) receives rays of light (230) from an object (210) and re-directs them toward a small pinhole or aperture (240) that is located beyond the back focus (220) of the lens. Said rays then continue beyond said aperture 240 to form an image (250). By virtue of the aperture 240 being optically conjugate with the point P (260), the hypercentric lens system accepts only those rays of light that appear to originate from point P.

FIG. 3 shows one form of the present hypercentric lens system invention in which a high NA aspherical lens element (300) is disposed with a second lens element (305) so as to receive light rays (330) from an object (310) and redirect them toward a compound lens (345) which has an aperture (340) that is located beyond the back focus (320) of the combination of said lens elements 300 and 305. Said compound lens (345) then refracts the light rays to form an image (350) of said object at a distance D1 (355) from said compound lens (345). By virtue of aperture (340) being optically conjugate with the point P (360), the hypercentric lens system accepts only those rays of light that appear to originate from point P.

FIG. 4, when compared to FIG. 3, illustrates a feature of the present hypercentric lens invention. When the object (310) is moved farther away from the lens element 300 to a position beyond point P (360), the final image formed by compound lens 345 occurs at a position that is a distance D2 from said compound lens. The distance D2 (355) is greater than D1 of FIG. 3. In general, this property of increased image distance as a result of increased object distance is opposite the effect realized with most conventional imaging systems.

The following refers to FIG. 3 and FIG. 4. The present invention is an imaging hypercentric lens assembly comprised of at least a first high NA (about 0.40 or greater) aspheric lens element (300) followed by at least one second lens element (305). The combination of the aspheric lens element (300) and second lens element (305) combine to comprise a First Lens Group. This First Lens Group collects light from an object (310).

A Second Lens Group (345) with a small entrance pupil aperture (340) is placed behind lens element (305). In general, the position of said aperture is also behind the back focus point (320) of the First Lens Group. Said aperture is optically conjugate with a point P (360) in front of the aspheric lens element (300). In this way, light rays that pass through said aperture (340) appear to originate from said point P.

Said Second Lens Group (345) refocuses the light rays passing through the aperture 340 and form an image (350) at a distance D1 (355) of the object (310) placed in front of the First Lens Group. In this combination, the present invention allows high NA aspheric lens elements to be used as part of a hypercentric lens assembly that produces good quality images of objects whose size is up to 90% of the diameter of the clear aperture of the high NA aspheric lens element.

A second property of the present invention is that objects placed beyond the point P may also be imaged. Said image (350) will occur at a distance D2 (355) from the Second Lens Group that is greater than the image distance D1 of objects that are placed between point P and aspheric lens element (300). Most conventional lens systems would produce such an image at a distance D2 that is less than D1, often so much less as to cause mechanical difficulty when using said lens system with an electronic camera housing.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. An imaging hypercentric lens assembly comprising:
   a) a first high numeric aperture aspheric lens element having an NA greater than or equal to about 0.40;
   b) a second lens element grouped with the first high numeric aperture aspheric lens element to form a first lens group; and
   c) a second lens group that includes an aperture stop located beyond the back focus of the first lens group such that the first and second lens groups form an imaging hypercentric lens assembly.

2. An imaging hypercentric lens assembly comprising of a first lens group that includes an aspheric lens element with a high NA of 0.40 or greater and a second lens element that converges the light emitted from the first element to a small spot, and further comprising a second lens group having an entrance pupil at the same position as the small light spot such that the entire assembly produces quality images of objects whose size can be up to 90% of the diameter of the clear aperture of the high NA aspheric lens element.

3. The invention of claim 2 where the image distance increases as a result of the object distance increasing.

4. An imaging hypercentric lens assembly comprising:
   a) a first high numeric aperture aspheric lens element having an NA greater than or equal to about 0.40;
   b) a second lens element grouped with the first high numeric aperture aspheric lens element to form a first lens group;
   c) a second lens group that includes an aperture stop located beyond the back focus of the first lens group such that the first and second lens groups form an imaging hypercentric lens assembly that accepts light rays from objects as large as 90% of the first high numeric aperture aspheric lens element.

5. The invention of claim 4 where the image distance increases as a result of the object distance increasing.

6. An imaging hypercentric lens assembly comprising:
   a) a first high numeric aperture aspheric lens element having an NA greater than or equal to about 0.40;
   b) a second lens element grouped with the first high numeric aperture aspheric lens element to form a first lens group;
   c) a second lens group that includes an aperture stop located beyond the back focus of the first lens group such that the first and second lens groups form an imaging hypercentric lens assembly such that the image distance increases as a result of the object distance increasing.

7. The invention of claim 6 where said hypercentric lens assembly accepts light rays from objects as large as 90% of the first high numeric aperture aspheric lens element.

* * * * *